United States Patent

Carrozza et al.

[11] Patent Number: 6,005,036
[45] Date of Patent: Dec. 21, 1999

[54] POLYSILANES

[75] Inventors: Primo Carrozza, Verona; Valerio Borzatta; Chryssostomos Chatgilialoglu, both of Bologna, all of Italy

[73] Assignee: Ciba Specialty Chemical Corporation, Tarrytown, N.Y.

[21] Appl. No.: 08/981,433

[22] PCT Filed: Jun. 20, 1996

[86] PCT No.: PCT/EP96/02667

§ 371 Date: Dec. 22, 1997

§ 102(e) Date: Dec. 22, 1997

[87] PCT Pub. No.: WO97/02322

PCT Pub. Date: Jan. 23, 1997

[30] Foreign Application Priority Data

Jul. 3, 1995 [EP] European Pat. Off. .............. 95810438

[51] Int. Cl.$^6$ ...................................... C08K 5/54
[52] U.S. Cl. ........................... 524/265; 524/267; 528/15; 528/31; 556/430; 556/470
[58] Field of Search .................... 556/430, 470; 528/15, 31; 524/267, 265

[56] References Cited

U.S. PATENT DOCUMENTS 5,087,685  2/1992  Satori et al. .............................. 556/430
5,087,719  2/1992  Tilley et al. ............................. 556/430
5,663,271  9/1997  Hatanaka ................................. 556/430

FOREIGN PATENT DOCUMENTS 152704   8/1985  European Pat. Off. .
2616152  12/1988 France .

OTHER PUBLICATIONS

Derwent Abst. 361941 for JP 04264132.
Derwent Abst. 186472 for JP 06122796.

*Primary Examiner*—Melvyn I. Marquis
*Attorney, Agent, or Firm*—Luther A.R. Hall

[57] ABSTRACT

A composition containing an organic material subject to oxidative, thermal or actinic degradation can be stabilized by an effective amount of at least one polysilane compound of formula I

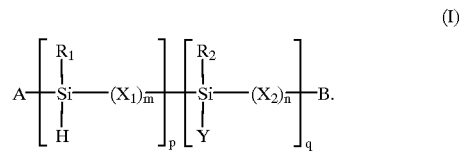

Preferred compounds are where q is zero, p is 2 to 50, m is zero, $R_1$ is alkyl, phenyl or benzyl, and A and B are independently hydrogen or a group —Si(E)$_3$ where E is alkyl. These compounds can also be copolymeric having a random, alternate or block distribution of individual structural units. These compounds are particularly suitable as process stabilizers.

14 Claims, No Drawings

POLYSILANES

The instant invention relates to a composition containing an organic material subject to oxidative, thermal or actinic degradation and a polysilane derivative, to the use of polysilane derivatives as process stabilizers and to novel polysilane derivatives.

Polyphenylsilanes and their use in photography are for example described in Derwent 94-297018/37. Photo and radiation-sensitive organopolymeric materials containing silane bonds are described in EP-A-129 834. The use of polysilane derivatives as fibres and films is described in U.S. Pat. No. 5,241,029. Polyolefin compositions comprising an organic polysilane are described, for example, in JP-A-Sho 63/105 048 and JP-A-Hei 3/212 438. Poly[(phenylsilylene) ethylene] grafted on polyethylene is described in Chemical Abstracts 73:67193.

In particular, the instant invention relates to a composition containing an organic material subject to oxidative, thermal or actinic degradation and at least one compound of the formula (I)

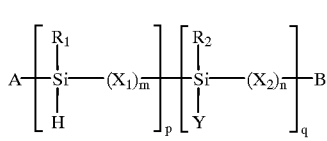

(I)

wherein p+q is a number from 2 to 100 and q varies from 0 to 50% of the sum of p+q;

m and n which are identical or different are zero or 1;

$R_1$ and $R_2$ which are identical or different are $C_1$–$C_{18}$alkyl, $C_5$–$C_{12}$cycloalkyl unsubstituted or mono-, di- or tri-substituted by $C_1$–$C_4$alkyl; phenyl unsubstituted or mono-, di- or tri-substituted by $C_1$–$C_4$alkyl, $C_1$–$C_4$alkoxy and/or $C_2$–$C_{20}$alkanoyl; naphthyl unsubstituted or mono-, di- or tri-substituted by $C_1$–$C_4$alkyl, $C_1$–$C_4$alkoxy and/or $C_2$–$C_{20}$alkanoyl; or $C_7$–$C_9$phenylalkyl unsubstituted or mono-, di- or tri-substituted on the phenyl by $C_1$–$C_4$alkyl, $C_1$–$C_4$alkoxy and/or $C_2$–$C_{20}$alkanoyl;

Y is $C_1$–$C_{18}$alkyl, $C_5$–$C_{12}$cycloalkyl unsubstituted or mono-, di- or tri-substituted by $C_1$–$C_4$alkyl; phenyl unsubstituted or mono-, di- or tri-substituted by $C_1$–$C_4$alkyl, $C_1$–$C_4$alkoxy and/or $C_2$–$C_{20}$alkanoyl; naphthyl unsubstituted or mono-, di- or tri-substituted by $C_1$–$C_4$alkyl, $C_1$–$C_4$alkoxy and or $C_2$–$C_{20}$alkanoyl; $C_7$–$C_9$phenylalkyl unsubstituted or mono-, di- or tri-substituted on the phenyl by $C_1$–$C_4$alkyl, $C_1$–$C_4$alkoxy and/or $C_2$–$C_{20}$alkanoyl; chlorine, bromine, a group —$(CH_2)_{2-3}$—$Si(E)_3$ or a group —$N(R)_2$ with the radicals E being independently of one another $C_1$–$C_8$alkyl or phenyl and the radicals R being independently of one another hydrogen, $C_1$–$C_4$alkyl, $C_5$–$C_{12}$cycloalkyl or phenyl unsubstituted or mono-, di- or tri-substituted by $C_1$–$C_4$alkyl, $C_1$–$C_4$alkoxy and/or $C_2$–$C_{20}$alkanoyl;

and, when m is 1 and n is zero, Y is additionally hydrogen;

$X_1$ and $X_2$ which are identical or different are $C_2$–$C_{12}$alkylene, $C_4$–$C_{12}$alkylene interrupted by oxygen or a group >N—R with R being as defined above; $C_2$–$C_{12}$alkenylene, $C_2$–$C_{12}$alkynylene, phenylene, biphenylene or a group of the formula (II)

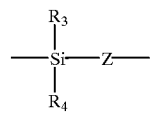

(II)

wherein $R_3$ and $R_4$ which are identical or different have one of the meanings given for $R_1$ and $R_2$ and Z is oxygen, a group >N—R or a group —N(R)—N(R)— with R being as defined above; and A and B which are identical or different have one of the meanings given for $R_1$ and $R_2$ or are hydrogen, a group —$OSi(E)_3$ or a group —$Si(E)_3$ with E being as defined above; when p+q is a number from 3 to 10, A and B together also form a direct bond; and each of the radicals $R_1$, $R_2$, $X_1$, $X_2$ and Y as well as the variables m and n have the same or different definitions in the recurring structural units contained in the formula (I) and, when the compounds of the formula (I) are copolymeric, they have a random, alternate or block distribution of the individual structural units.

Examples of alkyl having not more than 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl. In the compounds of the formula (I), a preferred meaning of $R_1$ and $R_2$ is $C_1$–$C_{10}$alkyl, particularly $C_1$–$C_8$alkyl, for example $C_1$–$C_6$alkyl or $C_1$–$C_4$alkyl. In the compounds of the formula (Ia) $R_1$ and $R_2$ may be for example $C_7$–$C_{18}$alkyl or $C_{10}$–$C_{18}$alkyl. The radicals E are preferably $C_1$–$C_6$alkyl, particularly $C_1$–$C_4$alkyl.

Examples of unsubstituted or substituted $C_5$–$C_{12}$cycloalkyl are cyclopentyl, methylcyclopentyl, dimethylcyclopentyl, cyclohexyl, methylcyclohexyl, dimethylcyclohexyl, trimethylcyclohexyl, t-butylcyclohexyl, cyclooctyl, cyclodecyl and cyclododecyl. Unsubstituted or substituted $C_5$–$C_7$cycloalkyl, in particular cyclohexyl is preferred.

Examples of substituted phenyl are methylphenyl, dimethylphenyl, trimethylphenyl, t-butylphenyl, di-t-butylphenyl, 3,5-di-t-butyl4-methylphenyl, methoxyphenyl, ethoxyphenyl, methyl-methoxyphenyl, acetylphenyl and butanoylphenyl. $C_2$–$C_{20}$alkanoyl substituted phenyl is one of the preferred meanings of $R_1$.

Examples of substituted naphthyl are methylnaphthyl, dimethylnaphthyl, trimethylnaphthyl, t-butylnaphthyl, di-t-butylnaphthyl, methoxynaphthyl, ethoxynaphthyl, methyl-methoxynaphthyl, acetylnaphthyl and butanoylnaphthyl.

Examples of $C_7$–$C_9$phenylalkyl which is unsubstituted or substituted on the phenyl are benzyl, methylbenzyl, dimethylbenzyl, trimethylbenzyl, t-butylbenzyl, methoxybenzyl, acetylbenzyl and 2-phenylethyl. Unsubstituted or substituted benzyl is preferred.

Examples of $C_2$–$C_{12}$alkylene are ethylene, propylene, trimethylene, tetramethylene, pentamethylene, 2,2-dimethyltrimethylene, hexamethylene, trimethylhexamethylene, octamethylene, decamethylene and dodecamethylene. $C_2$–$C_{10}$alkylene, in particular $C_2$–$C_8$alkylene or $C_2$–$C_6$alkylene, are preferred.

Examples of $C_4$–$C_{12}$alkylene interrupted by oxygen, e.g. 1, 2 or 3 oxygen, are 3-oxapentane-1,5-diyl, 4-oxaheptane-1,7-diyl, 3,6-dioxaoctane-1,8-diyl, 4,7-dioxadecane-1,10-diyl, 4,9-dioxadodecane-1,12-diyl and 3,6,9-trioxaundecane-1,11-diyl.

A representative example of $C_4$–$C_{12}$alkylene interrupted by a group >N—R is the group

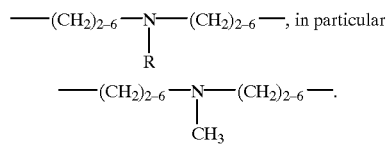, in particular

—$(CH_2)_{2-6}$—N($CH_3$)—$(CH_2)_{2-6}$—.

Examples of $C_2$–$C_{12}$alkenylene are ethen-1,2-diyl, 2-buten-1,4-diyl, 2-penten-1,5-diyl, 1,3-pentadien-1,5-diyl, 2-hexene-1,6-diyl, 3-hexene-1,6-diyl, 1,4-hexadiene-1,6-diyl, 1,5-hexadiene-1,6-diyl, 2,4-hexadiene-1,6-diyl, 2-heptene-1,7-diyl, 1-octene-1,8-diyl 2-octene-1,8-diyl, 1,7-octadiene-1,8-diyl, 1-decene-1,10-diyl, 5-decene-1,10-diyl and 1-dodecene-1,12-diyl.

Examples of $C_2$–$C_{12}$alkynylene are ethyndiyl and 1,3-butadiyn-1,4-diyl.

Examples of the range p+q are 2–80, 2–50, 2–30, 4–100, 7–100, 4–30 and 7–30. Particularly preferred is the range 4–30.

q may vary, for example, from 0 to 40%, 0 to 25%, 0 to 20%, 5 to 50%, 5 to 25% or 10 to 50% of the sum of p+q. q is preferably zero.

The radical R is preferably different from hydrogen.

Those compositions are preferred, wherein p+q is a number from 2 to 80;

$R_1$ and $R_2$ which are identical or different are $C_1$–$C_{12}$alkyl, $C_5$–$C_7$cycloalkyl unsubstituted or mono-, di- or tri-substituted by $C_1$–$C_4$alkyl; phenyl unsubstituted or mono-, di- or tri-substituted by $C_1$–$C_4$alkyl, $C_1$–$C_4$alkoxy and/or $C_2$–$C_{20}$alkanoyl; or benzyl unsubstituted or mono-, di- or tri-substituted on the phenyl by $C_1$–$C_4$alkyl, $C_1$–$C_4$alkoxy and/or $C_2$–$C_{20}$alkanoyl;

Y is $C_1$–$C_{10}$alkyl, $C_5$–$C_7$cycloalkyl unsubstituted or mono-, di- or tri-substituted by $C_1$–$C_4$alkyl; phenyl unsubstituted or mono-, di- or tri-substituted by $C_1$–$C_4$alkyl, $C_1$–$C_4$alkoxy and/or $C_2$–$C_{20}$alkanoyl; benzyl unsubstituted or mono-, di- or tri-substituted on the phenyl by $C_1$–$C_4$alkyl, $C_1$–$C_4$alkoxy and/or $C_2$–$C_{20}$alkanoyl; chlorine, bromine, a group —$(CH_2)_{2-3}$—Si(E)$_3$ or a group —N(R)$_2$ with the radicals E being independently of one another $C_1$–$C_6$alkyl or phenyl and the radicals R being independently of one another hydrogen, $C_1$–$C_4$alkyl, $C_5$–$C_7$cycloalkyl or phenyl unsubstituted or mono-, di- or tri-substituted by $C_1$–$C_4$alkyl, $C_1$–$C_4$alkoxy and/or $C_2$–$C_{20}$alkanoyl;

and, when m is 1 and n is zero, Y is additionally hydrogen;

$X_1$ and $X_2$ which are identical or different are $C_2$–$C_8$alkylene, $C_4$–$C_8$alkylene interrupted by oxygen or a group >N—R with R being as defined above; $C_2$–$C_8$alkenylene, $C_2$–$C_8$alkynylene, phenylene, biphenylene or a group of the formula (II).

Those compositions are particularly preferred, in which p+q is a number from 2 to 50;

$R_1$, $R_2$ and Y which are identical or different are $C_1$–$C_{12}$alkyl, cyclohexyl unsubstituted or mono-, di- or tri-substituted by $C_1$–$C_4$alkyl; phenyl unsubstituted or mono-, di- or tri-substituted by $C_1$–$C_4$alkyl, $C_1$–$C_4$alkoxy and/or $C_2$–$C_{20}$alkanoyl; or benzyl unsubstituted or mono-, di- or tri-substituted on the phenyl by $C_1$–$C_4$alkyl, $C_1$–$C_4$alkoxy and/or $C_2$–$C_{20}$alkanoyl;

and, when m is 1 and n is zero, Y is additionally hydrogen;

$X_1$ and $X_2$ which are identical or different are $C_2$–$C_6$alkylene, $C_4$–$C_6$alkylene interrupted by oxygen; $C_2$–$C_8$alkenylene, $C_2$–$C_8$alkynylene, phenylene or a group of the formula (II).

In the compositions according to the instant invention $R_1$ is preferably phenyl unsubstituted or mono-, di- or tri-substituted by $C_1$–$C_4$alkyl, $C_1$–$C_4$alkoxy and/or $C_2$–$C_{20}$alkanoyl.

Compositions wherein q is zero, p is a number from 2 to 40, m is zero and $R_1$ is phenyl unsubstituted or substituted by $C_2$–$C_{20}$alkanoyl relate to a further preferred embodiment of the instant invention.

Compositions wherein $X_1$ and/or $X_2$ are a group of the formula (II) and Z is oxygen as well as compositions wherein A and B are hydrogen are also preferred.

Of further interest are compositions wherein q is zero and p is a number from 2 to 50;

m is zero;

$R_1$ is $C_1$–$C_{12}$alkyl, phenyl or benzyl; and

A and B which are identical or different are hydrogen or a group —Si(E)$_3$ with E being $C_1$–$C_8$alkyl.

The compounds of the formula (I) can be prepared by processes known per se, for example as indicated below.

Process 1

When m and n are zero and A and B are hydrogen, the compounds of the formula (I) may be prepared for example A) by dehydrogenative coupling reaction (oligomerization) starting from the suitable hydrosilane intermediate in the presence of catalytic amounts of organo-transition metal complexes, in particular in the presence of $\eta^5$-cyclopentadienyl complexes of Ti, Zr, V, U, Hf, Nd, Y and Sc as reported, for example, in U.S. Pat. Nos. 4,965,386, 5,087,719, J.A.C.S. 111, 8043–44, 1989, J.A.C.S. 108,4059–66, 1986 and Acc. Chem. Res. 26, 22–29, 1993. The complexes of Zr and Ti are preferred, in particular the following complexes:

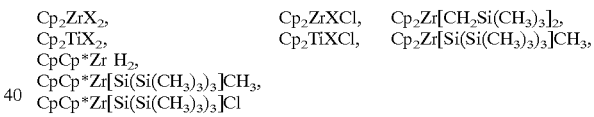

with Cp = $\eta^5$-cyclopentadienyl, Cp* = $\eta^5$-pentamethylcyclopentadienyl and X = $C_1$–$C_8$ alkyl.

The reaction can be carried out without a solvent or in an inert solvent, for example benzene, toluene, ethylbenzene, xylene or tetrahydrofurane. Toluene and ethylbenzene are preferred solvents. The reaction temperature is for example −20° C. to 140° C., preferably −10° C. to 80° C., in particular −10° C. to 30° C.

When q is different from zero and A, B, m and n have the above mentioned meanings, the cooligomeric compounds of the formula (I) may also be prepared by a radical hydrosilylation reaction (as reported for example in J.A.C.S. 116, 9779–80, 1994) of the suitable polyhydrosilane obtained as previously described with the appropriate molar ratio of the suitable alkene or keto compound; or B) by Wurtz's coupling (oligomerization) of the suitable substituted dichlorosilanes and monochlorosilanes with Na or Mg as reactants as described in JP 91-45479 (Chem. Abstr. 118: 103000 and Derwent 92-361941/44) and J. Chem. Rev. 89, 1359–1410, 1989. The reaction may be carried out with molten Na or by using organomagnesium compounds (Grignard reaction) in a hydrocarbon solvent or toluene.

When A and B are different from hydrogen and —OSi(E)$_3$, the appropriate monochlorosilane chain terminator may be reacted with the dichloro intermediate in the same way.

When A and B are —OSi(E)₃ with E as defined above, the appropriate silanol chain terminator may be reacted with the dichloro intermediate.

Process 2

When m and n are 1 and A and B are hydrogen, the compounds of the formula (I) may be prepared for example A) in case $X_1$ and $X_2$, which are identical or different, are $C_2$–$C_{12}$alkylene, $C_4$–$C_{12}$alkylene interrupted by oxygen or a group >N—R with R being as defined above, by cooligomerization through a hydrosilylation reaction of the appropriate hydrosilane intermediate containing alkene groups capable of forming the groups $X_1$ and $X_2$ as previously defined.

B) in case $X_1$ and $X_2$, which are identical or different, are $C_2$–$C_{12}$alkylene, $C_4$–$C_{12}$alkylene interrupted by oxygen or a group >N—R with R being as defined above, $C_2$–$C_{12}$alkenylene, $C_2$–$C_{12}$alkynylene, phenylene or biphenylene, by Wurtz's coupling (cooligomerization) of the appropriate dichlorosilane intermediate with a dilithium or disodium salt of the appropriate alkylene, alkenylene, alkynylene, phenylene or biphenylene derivatives as, for example, reported in Macromolecules 27 (20), 5583–90, 1994. The suitable hydromonochlorosilane is used as chain terminator; or C) in case $X_1$ and $X_2$, which are identical or different, are a group of the formula (II), by cooligomerization through Wurtz's reaction of the appropriate intermediate (III)

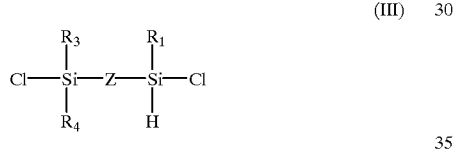

(III)

with the appropriate chlorosilane intermediate. The intermediate (III) can be prepared according to known literature methods.

When Z is different from oxygen, the compounds can also be prepared by polycondensation of the appropriate dichlorosilane intermediate with $NH_2(R)$ and $NH(R)$—$NH(R)$ as described, for example, in JP 84-193867 (Chem. Abstr. 105:173 308 and Derwent 86-134824/21)

An appropriate hydromonochlorosilane is used as chain terminator.

Process 3

When m is zero and n is 1 or when m is 1 and n is zero, and A and B are hydrogen, the compounds of the formula (I) can be prepared, for example, by using the same synthesis procedure as described for process 2 with suitable silane intermediates in the appropriate molar ratios.

When A and B are different from hydrogen in processes 2 and 3, the appropriate monochlorosilane chain terminator can be reacted with the suitable dichlorosilane intermediate following the Wurtz's reaction as described above.

When A and B are a group —OSi(E)₃ with E being as defined above, the appropriate silanol chain terminator can be reacted with the proper dichlorosilane intermediate.

The starting materials are commercially available or can be prepared by known processes, for example as described in Houben-Weyl, volume 13, part 5.

The compounds of the formula (I) are useful for stabilizing organic materials against thermal, oxidative or actinic degradation. Examples for organic materials which can be used in the compositions according to the instant invention are 1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly((α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrenelmaleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terepthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

30. Aqueous emulsions of natural or synthetic rubber, e.g. natural latex or latices of carboxylated styrene/butadiene copolymers.

The compounds of the formula (I) are particularly suitable for improving the heat stability and oxidation stability of synthetic polymers, in particular polyolefins, especially polyethylene and polypropylene. The compounds of the formula (I) can be used in mixtures with organic materials in various proportions depending on the nature of the material to be stabilized, on the end use and on the presence of other additives.

In general, it is appropriate to use, for example, 0.01 to 5% by weight of the compounds of the formula (I), relative to the weight of the material to be stabilized, preferably between 0.05 and 1%.

In general, the compounds of the formula (I) can be added to the polymeric materials before, during or after the polymerisation or crosslinking of the said materials.

The compounds of the formula (I) can be incorporated in the polymeric materials, for example, in the pure form or encapsulated in waxes, oils or polymers.

The compounds of the formula (I) can be incorporated in the polymeric materials by various processes, such as dry mixing in the form of powder, or wet mixing in the form of solutions or suspensions or also in the form of a masterbatch; in such operations, the polymer can be used in the form of powder, granules, solutions, suspensions or in the form of latices.

The materials stabilized with the compounds of the formula (I) can be used for the production of mouldings, films, tapes, monofilaments, fibres, surface coatings and the like.

If desired, other conventional additives for synthetic polymers, such as antioxidants, UV absorbers, nickel stabilizers, pigments, fillers, plasticisers, antistatic agents, flameproofing agents, lubricants, corrosion inhibitors and metal deactivators, can be added to the mixtures of the compounds of the formula (I) with the organic materials.

Particular examples of additives which can be used in admixture with the compounds of the formula (I) are:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl) disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)4-n-dodecylmercaptobutane, 1,1,5,5-tetra-(5-tert-butyl-4-hydroxy2-methylphenyl)pentane.

1.7. O-, N- and S-benzyl compounds, for example 3,5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)-amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4-hydroxybenzylmercaptoacetate.

1.8. Hydroxvbenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis-[4-(1, 1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3, 5-triazine, 2-octylmercapto-4,6-bis(3,5-di-tert-butyl-4- hydroxyanilino)-1,3,5-triazine, 2-octylmercapto4,6-bis(3,5-di-tert-butyl-4-hydroxyphenoxy)-1,3,5-triazine, 2,4,6-tris(3,5-di-tert-butyl4-hydroxyphenoxy)-1,2,3-triazine, 1,3,5-tris-(3,5-di-tert-butyl4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]-octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo-[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)-diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylamino-phenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, Bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octylphenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-((α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H- benzotriazole with polyethylene glycol 300; [R—CH$_2$CH$_2$—COO(CH$_2$)$_3$—]$_2$, where R=3'-tert-butyl-4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodeyloxy, 4-benzyloxy, 4,2',4'-trihydroxy and 2'-hydroxy-4,4'-dimethoxy derivatives.

2.3. Esters of substituted and unsubstituted benzoic acids, as for example 4-tert-butylphenyl salicylate, phenyl salicylate, octylphenyl salicylate, dibenzoyl resorcinol, bis (4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel comounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dion, bis(1-octyloxy-2,2,6,6-tetramethylpiperidyl) sebacate, bis(1-octyloxy-2,2,6,6-tetramethylpiperidyl) succinate, the condensate of N,N'-bis-(2,2,6,6-tetramethyl-4-piperidyl)hexamethylenediamine and 4-morpholino-2,6-dichloro-1,3,5-triazine, the condensate of 2-chloro-4,6-bis (4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl) hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxα-3,8-diazα-4-oxo-spiro[4,5]decane, a reaction product of 7,7,9,9-tetramethyl-2-cycloundecyl-1-oxα-3,8-diazα-4-oxospiro [4,5]decane und epichlorohydrin.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy) phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-tiiazine, 2-(2-hydroxy-4-hexyloxy) phenyl-4,6-diphenyl-1,3,5-triazine, 2-(2-hydroxy4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)-thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-1$^2$-methyl-dibenz[d,g]-1,3,2-dioxaphosphocin, bis(2,4-di-tert-butyl-6-methylphenyl)

methylphosphite, bis(2,4-di-tert-butyl-6-methylphenyl) ethylphosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitronitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides andlor phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers ("ionomers").

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863, 4,338,244, 5,175,312, 5,216,052, 5,252,643, DE-A-4 316 611, DE-A-4 316 622, DE-A-4 316 876, EP-A-0 589 839 or EP-A-0 591 102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]-phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

The ratio by weight of the compounds of the formula (I) to the conventional additives is for example 1:0.5 to 1:5.

The compounds of the formula (I) are particularly useful as process stabilizers.

Some compounds of the formula (I) are novel. Therefore, a further object of the instant invention is a compound of the formula (Ia)

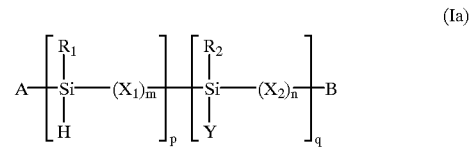

(Ia)

wherein p+q is a number from 2 to 100 and q varies from 0 to 50% of the sum of p+q;

m and n which are identical or different are zero or 1;

$R_1$ and $R_2$ which are identical or different are $C_1$–$C_{18}$alkyl, $C_5$–$C_{12}$cycloalkyl unsubstituted or mono-, di- or tri-substituted by $C_1$–$C_4$alkyl; phenyl mono-, di- or tri-substituted by $C_1$–$C_4$alkoxy and/or $C_2$–$C_{20}$alkanoyl; naphthyl unsubstituted or mono-, di- or tri-substituted by $C_1$–$C_4$alkyl, $C_1$–$C_4$alkoxy and/or $C_2$–$C_{20}$alkanoyl; or $C_7$–$C_9$phenylalkyl mono-, di- or tri-substituted on the phenyl by $C_1$–$C_4$alkyl, $C_1$–$C_4$alkoxy and/or $C_2$–$C_{20}$alkanoyl;

Y is $C_1$–$C_{18}$alkyl, $C_5$–$C_{12}$cycloalkyl unsubstituted or mono-, di- or tri-substituted by $C_1$–$C_4$alkyl; phenyl unsubstituted or mono-, di- or tri-substituted by $C_1$–$C_4$alkyl, $C_1$–$C_4$alkoxy and/or $C_2$–$C_{20}$alkanoyl; naphthyl unsubstituted or mono-, di- or tri-substituted by $C_1$–$C_4$alkyl, $C_1$–$C_4$alkoxy and/or $C_2$–$C_{20}$alkanoyl; $C_7$–$C_9$phenylalkyl unsubstituted or mono-, di- or tri-substituted on the phenyl by $C_1$–$C_4$alkyl, $C_1$–$C_4$alkoxy and/or $C_2$–$C_{20}$alkanoyl; chlorine, bromine, a group —$(CH_2)_{2-3}$—$Si(E)_3$ or a group —$N(R)_2$ with the radicals E being independently of one another $C_1$–$C_8$alkyl or phenyl and the radicals R being independently of one another hydrogen, $C_1$–$C_4$alkyl, $C_5$–$C_{12}$cycloalkyl or phenyl unsubstituted or mono-, di- or tri-substituted by $C_1$–$C_4$alkyl, $C_1$–$C_4$alkoxy and/or $C_2$–$C_{20}$alkanoyl;

and, when m is 1 and n is zero, Y is additionally hydrogen;

$X_1$ and $X_2$ which are identical or different are $C_2$–$C_{12}$alkylene, $C_4$–$C_{12}$alkylene interrupted by oxygen or a group >N—R with R being as defined above; $C_2$–$C_{12}$alkenylene, $C_2$–$C_{12}$alkynylene, phenylene, biphenylene or a group of the formula (II)

(II)

wherein $R_3$ and $R_4$ which are identical or different have one of the meanings given for $R_1$ and $R_2$ and Z is oxygen, a group >N—R or a group —N(R)—N(R)—with R being as defined above; and A and B which are identical or different have one of the meanings given for $R_1$ and $R_2$ or are hydrogen, a group —OSi(E)$_3$ or a group —Si(E)$_3$ with E being as defined above; when p+q is a number from 3 to 10, A and B together also form a direct bond; when R$_1$ and/or R$_2$ are C$_1$–C$_6$alkyl, at least one group of the formula (II) is present in the compounds of the formula (Ia);

each of the radicals R$_1$, R$_2$, X$_1$, X$_2$ and Y as well as the variables m and n have the same or different definitions in the recurring structural units contained in the formula (Ia) and, when the compounds of the formula (Ia) are copolymeric, they have a random, alternate or block distribution of the individual structural units.

Preferred compounds of the formula (Ia) are those, wherein p+q is a number from 2 to 80;

R$_1$ and R$_2$ which are identical or different are C$_{10}$–C$_{18}$alkyl, C$_5$–C$_7$cycloalkyl unsubstituted or mono-, di- or tri-substituted by C$_1$–C$_4$alkyl; phenyl mono-, di- or tri-substituted by C$_1$–C$_4$alkoxy and/or C$_2$–C$_{20}$alkanoyl; or benzyl mono-, di- or tri-substituted on the phenyl by C$_1$–C$_4$alkyl, C$_1$–C$_4$alkoxy and/or C$_2$–C$_{20}$alkanoyl;

Y is C$_1$–C$_{10}$alkyl, C$_5$–C$_7$cycloalkyl unsubstituted or mono-, di- or tri-substituted by C$_1$–C$_4$alkyl; phenyl unsubstituted or mono-, di- or tri-substituted by C$_1$–C$_4$alkyl, C$_1$–C$_4$alkoxy and/or C$_2$–C$_{20}$alkanoyl; benzyl unsubstituted or mono-, di- or tri-substituted on the phenyl by C$_1$–C$_4$alkyl, C$_1$–C$_4$alkoxy and/or C$_2$–C$_{20}$alkanoyl; chlorine, bromine, a group —(CH$_2$)$_{2-3}$—Si(E)$_3$ or a group —N(R)$_2$ with the radicals E being independently of one another C$_1$–C$_6$alkyl or phenyl and the radicals R being independently of one another hydrogen, C$_1$–C$_4$alkyl, C$_5$–C$_7$cycloalkyl or phenyl unsubstituted or mono-, di- or tri-substituted by C$_1$–C$_4$alkyl, C$_1$–C$_4$alkoxy and/or C$_2$–C$_{20}$alkanoyl;

and, when m is 1 and n is zero, Y is additionally hydrogen;

X$_1$ and X$_2$ which are identical or different are C$_2$–C$_8$alkylene, C$_4$–C$_8$alkylene interrupted by oxygen or a group >N—R with R being as defined above; C$_2$–C$_8$alkenylene, C$_2$–C$_8$alkynylene, phenylene, biphenylene or a group of the formula (II).

The following examples illustrate the present invention more clearly. Parts and percentages are by weight, unless stated otherwise.

Of particular interest are examples 1, 2, 5, 7 and 9.

In the following examples, the number average molecular weight $\overline{Mn}$ is determined by GPC (Gel Permeation Chromatography). The GPC measurements are carried out on a ®Perkin Elmer LC 250 liquid chromatograph equipped with a refractive index ®Perkin Elmer LC 30 and $\overline{Mn}$ is calculated by using a ®Perkin Elmer software Nelson 900. All GPC measurements are carried out using air free chromatographic grade toluene as solvent at 45° C. Polystyrene standards are used for the calibration curve and are supplied by Polymer Laboratories (Shropshire, U.K.). The used columns are PLGEL (Polymer Laboratories-Shropshire U.K.) 300 mm×7.5 mm Stationary phase 3$\mu$Mixed E supplied by Polymer Laboratories.

The NMR spectra are recorded at 300 MHz and 22° C.

EXAMPLE 1

Preparation of the compound of the formula

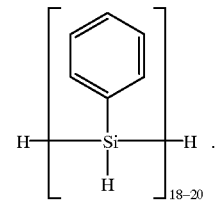

To a mixture of 0.35 g (1.2 mmoles) of η$^5$-cyclopentadienyl zirconium chloride in 8.5 ml of ethylbenzene, cooled at −78° C. under Argon atmosphere, 1.5 ml of methyl lithium in diethyl ether (1.6 M solution) are added slowly under stirring. The mixture is then heated to 0° C. and kept at this temperature for ½ hour. 16.6 g (153 mmoles) of phenylsilane are subsequently added and the solution is heated to room temperature. The solution is stirred for 41 hours.

Then, the solution is passed through a ®Florisil (100–200 mesh) column with toluene as percolant solvent. The solution is evaporated under vacuum, taken up with a small portion of toluene and passed again through a ®Florisil (100–200 mesh) column with toluene. After evaporation of the solvent under vacuum, a white product is obtained with a melting point of 32–35° C. and an average molecular weight of 2100 (by GPC). $^1$H and $^{13}$C NMR analyses are consistent with the indicated structure.

$^1$H NMR (CDCl$_3$), δ: 4.1–4.7 ppm (m; broad; SiH), 6.8–7.7 ppm (m; broad; C$_6$H$_5$). $^{13}$C NMR (C$_6$D$_6$), δ: 128.0 ppm, 137.0 ppm (m; C$_6$H$_5$).

EXAMPLE 2

Following the process described in Example 1, using the same reagents in the same molar ratios but carrying out the reaction for only 36 hours, the compound of the formula

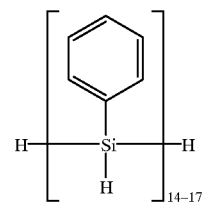

is prepared.

The product obtained is white and resinous and has an average molecular weight of 1700 (by GPC=gas pressure chromatography)). $^1$H and $^{13}$C NMR analyses are consistent with the indicated structure.

$^1$H NMR (CDCl$_3$), δ: 4.1–4.7 ppm (m; broad; SiH), 6.8–7.8 ppm (m; broad; C$_6$H$_5$). $^{13}$C NMR (C$_6$D$_6$), δ: 128.2 ppm, 137.0 ppm (m; C$_6$H$_5$).

EXAMPLE 3

Following the process described in Example 1, using the same reagents in the same molar ratios but using η$^5$-cyclopentadienyl titanium chloride instead of η$^5$-cyclopentadienyl zirconium chloride, the compound of the formula

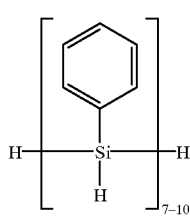

is prepared.

The product obtained is a white oil and has an average molecular weight of 960 (by GPC). $^1$H and $^{13}$C NMR analyses are consistent with the indicated structure.

$^1$H NMR (CDCl$_3$), δ: 4.1–4.7 ppm (m; broad; SiH), 6.8–7.7 ppm (m; broad; C$_6$H$_5$). $^{13}$C NMR (C$_6$D$_6$), δ: 128.1 ppm, 137.1 ppm (m; C$_6$H$_5$).

EXAMPLE 4

Preparation of the compound of the formula

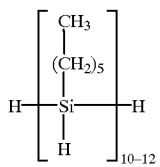

To a mixture of 0.4 g (1.3 mmoles) of η$^5$-cyclopentadienyl zirconium chloride in 10 ml of toluene, cooled at −65° C. under nitrogen atmosphere, 1.6 ml of methyl lithium in diethyl ether (1.6 M solution) are added slowly under stirring. The mixture is then heated to 0° C. and kept at this temperature for ½ hour. 20.0 g (172 mmoles) of n-hexylsilane are subsequently added and the solution is heated to room temperature. The solution is stirred for 70 hours; then, the solution is passed through a ®Florisil (100–200 mesh) column with toluene as percolant solvent. The solution is evaporated under vacuum and a white oil is obtained with an average molecular weight of 1300 (by GPC). $^1$H and $^{13}$C NMR analyses are consistent with the indicated structure.

$^1$H NMR (C$_6$D$_6$), δ: 0.35 ppm (s; CH$_2$Si), 0.8–1.0 ppm (t; CH$_3$), 1.2–1.7 ppm (m; broad; (CH$_2$)$_4$), 3.9–4.2 ppm (m; broad; SiH). $^{13}$C NMR (C$_6$D$_6$), δ: 14.37 ppm, 23.07 ppm, 31.99 ppm, 127.5 ppm, 128.05 ppm, 128.5 ppm.

EXAMPLE 5

Following the process described in Example 4, using the same reagents in the same molar ratios but using n-dodecylsilane instead of n-hexylsilane, the compound of the formula

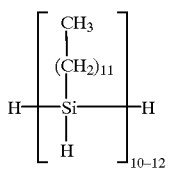

is prepared. The product obtained is a white oil and has an average molecular weight of 2050. $^1$H and $^{13}$C NMR analyses are consistent with the indicated structure.

$^1$H NMR (C$_6$D$_6$), δ: 0.4 ppm (s; CH$_2$Si), 0.8–0.9 ppm (t; CH$_3$), 1.2–1.7 ppm (m; broad; (CH$_2$)$_{10}$), 3.9–4.2 ppm (m; broad; SiH). $^{13}$C NMR (C$_6$D$_6$), δ: 14.40 ppm, 23.10 ppm, 31.99 ppm, 127.6 ppm, 128.05 ppm, 128.5 ppm.

EXAMPLE 6

Following the process described in Example 4, using the same reagents in the same molar ratios but using benzylsilane instead of n-hexylsilane, the compound of the formula

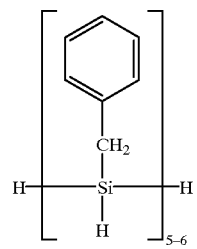

is prepared. The product obtained is a white oil and has an average molecular weight of 650. $^1$H and $^{13}$C NMR analyses are consistent with the indicated structure.

$^1$H NMR (C$_6$D$_6$), δ: 1.89 ppm (q; CH$_2$C$_6$H$_5$), 3.65 ppm (t; SiH), 6.9–7.2 ppm (m; broad; C$_6$H$_5$). $^{13}$C NMR (C$_6$D$_6$), δ: 15.73 ppm, 124.98 ppm, 128.98 ppm, 129.04 ppm, 129.66 ppm, 139.97 ppm.

EXAMPLE 7

Preparation of the compound of the formula

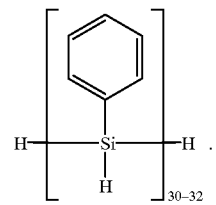

To a mixture of 0.16 g (0.554 mmoles) of η$^5$-cyclopentadienyl zirconium in 7.5 ml of methyl-tert-butylether, cooled at −65° C. under nitrogen atmosphere, 0.34 ml of methyl lithium in diethyl ether (1.6 M solution) are added slowly. The mixture is then heated to 0° C. and kept at this temperature for ½ hour. 15 g (139 mmoles) of phenylsilane are subsequently added and the solution is heated to room temperature. The solution is stirred for 34 hours; then, after dilution with further 7 ml of methyl-tert-butylether, the solution is treated with 1.5 g of bentonite (®Tonsyl) under stirring. The mixture is then filtered and evaporated under vacuum. A white product is obtained with a melting point of 30–33° C. and an average molecular weight of 3200 (by GPC). $^1$H and $^{13}$C NMR analyses are consistent with the indicated structure.

$^1$H NMR (CDCl$_3$), δ: 4.1–4.8 ppm (m; broad; SiH), 6.8–7.7 ppm (m; broad; C$_6$H$_5$). $^{13}$C NMR (C$_6$D$_6$), δ: 128.0 ppm, 137.0 ppm (m; C$_6$H$_5$).

EXAMPLE 8

Preparation of the compound of the formula

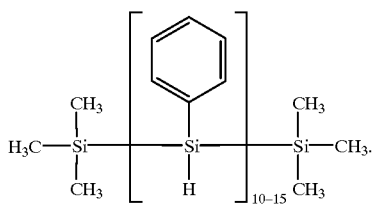

To a solution of 3.27 g (18.48 mmoles) of phenyldichlorosilane in 5 ml of toluene, 3.6 ml (40.65 mmoles) of metal sodium dispersion in toluene (30% w/v) are added at 0° C. The mixture is then slowly heated, under stirring and nitrogen atmosphere, to reflux temperature and kept at this temperature for 5 hours. The mixture is then cooled to room temperature and 0.5 ml (4 mmoles) of chlorotrimethylsilane are added under stirring. The mixture is filtered and the solution is evaporated under vacuum. The product obtained is a white oil and has an average molecular weight of 1560. $^{1}$H and $^{13}$C NMR analyses are consisted with the indicated structure.

$^{1}$H NMR (CDCl$_{3}$), δ: 0.0–0.15 ppm (s; Si(CH$_{3}$)$_{3}$). 4.0 ppm (m: broad; SiH), 6.8–7.7 ppm (m: broad; C$_{6}$H$_{5}$). $^{13}$C NMR (C$_{6}$D$_{6}$), δ: 1.9 ppm, 129.6 ppm, 129.9 ppm, 132.0 ppm. 133.6 ppm.

EXAMPLE 9

Preparation of the compound of the formula

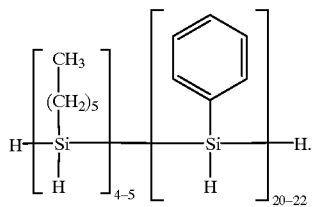

To a mixture of 0.7 g (2.4 mmoles) of η$^{5}$-cyclopentadienyl zirconium chloride in 16 ml of toluene, cooled at –65° C. under Argon atmosphere, 3.0 ml of methyl lithium in diethyl ether (1.6 M solution) are added slowly under stirring. The mixture is then heated to 0° C. and kept at this temperature for ½ hour. 6 g (51 mmoles) of n-hexylsilane and 27.6 g (255 mmoles) of phenylsilane are subsequently added and the solution is heated to room temperature. The solution is stirred for 24 hours. Then, the solution is passed through a ®Florisil (100–200 mesh) column with toluene as percolant solvent. The solution is evaporated under vacuum, and a white oil product is obtained with an average molecular weight of 2630. $^{1}$H and $^{13}$C NMR analyses are consistent with the indicated structure.

$^{1}$H NMR (CDCl$_{3}$), δ: 0.9–1.1 ppm (m; broad; CH$_{3}$), 1.1–1.6 ppm (m; broad; CH$_{2}$), 3.6–4.0 ppm (m; broad, n-hexyl SiH), 4.1–4.7 ppm (m; broad; C$_{6}$H$_{5}$SiH), 6.6–7.9 ppm (m; broad; C$_{6}$H$_{5}$). $^{13}$C NMR (CDCl$_{3}$), δ: 14.0 ppm, 22.4 ppm, 27.5 ppm, 31.2 ppm, 32.3 ppm, 127.8 ppm, 134.5 ppm, 136.8 ppm (broad).

EXAMPLE 10

Following the process described in Example 9, using the same reagents in the same molar ratios but using, benzylsilane instead of n-hexylsilane, the compound of the formula

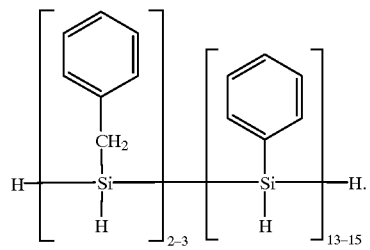

is prepared. The product obtained is a white oil and has an average molecular weight of 1600 (by GPC). $^{1}$H and $^{13}$C NMR analyses are consistent with the indicated structure.

$^{1}$H NMR (CDCl$_{3}$), δ: 1.4–2.8 ppm (m; broad; CH$_{2}$), 3.2–5.2 ppm (m; broad; C$_{6}$H$_{5}$CH$_{2}$SiH and C$_{6}$H$_{5}$SiH), 6.5–7.9 ppm (m; broad; C$_{6}$H$_{5}$). $^{13}$C NMR (CDCl$_{3}$), δ: 17.2 ppm, 19.2 ppm, 29.4 ppm, 29.7 ppm, 29.8 ppm, 124.6 ppm, 128.1 ppm, 134.0 ppm, 136.6 ppm (broad).

EXAMPLE 11

Stabilization of polypropylene during multiple extrusion.

1.3 kg of polypropylene powder (®Profax 6501; melt flow index: 3.2 measured at 230° C. with 2.16 kg) which are prestabilized with 0.025% of n-octadecyl-3-[3,5-di-tert-butyl-4-hydroxyphenyl]propionate are mixed with 0.05% of pentaerythrityl-tetrakis[3-(3,5-di-tert-butyl-4-hydroxyphenyl)propionate, 0.05% of tris[2,4-di-tert-butylphenyl]phosphite, 0.05% of calcium stearate, 0.03% of dihydrotalcite (®DHT 4A, Kyowa Chemical Industry Co., Ltd, [Mg$_{4.5}$AL$_{2}$(OH)$_{13}$CO$_{3}$×3.5 H$_{2}$O]) and 0.05% of the phenylsilane indicated in Table 1.

This mixture is extruded in an extruder having a cylinder diameter of 20 mm and a length of 400 mm at 100 revolutions per minute, the three heating zones being set to the following temperatures: 260° C., 270° C. and 280° C.). The extrudate is drawn through a waterbath for cooling and then granulated. These granules are extruded repeatedly. The melt index is measured "on line" during processing and corresponds to a value which would be measured conventionally at 230° C. with 2.16 kg/10 minutes. A large increase in the melt index means chain breakdown, that is to say poor stabilization. The results are summarized in Table 1.

TABLE 1

| Phenylsilane | Melt Index after the first and third Extrusion | |
|---|---|---|
| | first | third |
| no | 6.7 | 8.3 |
| Compound of Example 1 | 4.8 | 5.9 |
| Compound of Example 2 | 4.7 | 5.8 |
| Compound of Example 3 | 4.7 | 6.0 |

EXAMPLE 12

Stabilization of polypropylene during multiple extrusion.

1.5 kg polypropylene powder (®polychim A 10 TB; melt flow index: 2.7 measured at 230° C. with 2.16 kg) without prestabilization are mixed with 0.5 g of pentaerythrityltetrakis[3-(3,5-di-tert-butyl-4-hydroxyphenyl)propionate, 1 g of tris[2,4-di-tert-butylphenyl]phosphite, 0.75 g of calcium stearate and 0.75 g of the polysilane indicated in Table 2.

The mixture is extruded in an extruder having a cylinder diameter of 30 mm and a length of 250 mm at 40 revolutions per minute, the maximal extruder temperature being adjusted to 280° C. The extrudate is drawn through a waterbath for cooling and then granulated. This extrudate is extruded repeatedly. The melt index is measured "on line" during processing and corresponds to a value which would be measured conventionally at 230° C. with 2.16 kg/10 minutes. The melt index is determined after the first and third extrusion. A large increase in the melt index means chain breakdown, that is to say poor stabilization. The results are summarized in Table 2.

TABLE 2

| Polysilane | Melt Index after the first and third Extrusion | |
|---|---|---|
| | first | third |
| no | 4.8 | 6.8 |
| Compound of Example 4 | 4.5 | 6.1 |
| Compound of Example 7 | 4.1 | 5.4 |

We claim:

1. A composition containing an organic material subject to oxidative, thermal or actinic degradation and at least one compound of the formula (I)

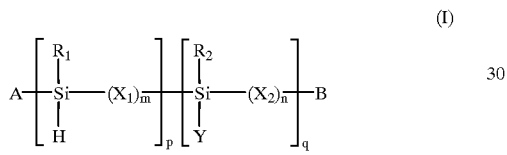

wherein p+q is a number from 2 to 100 and q varies from 0 to 50% of the sum of p+q;

m and n which are identical or different are zero or 1;

$R_1$ and $R_2$ which are identical or different are $C_1$–$C_{18}$alkyl, $C_5$–$C_{12}$cycloalkyl unsubstituted or mono-, di- or tri-substituted by $C_1$–$C_4$alkyl; phenyl unsubstituted or mono-, di- or tri-substituted by $C_1$–$C_4$alkyl, $C_1$–$C_4$alkoxy and/or $C_2$–$C_{20}$alkanoyl; naphthyl unsubstituted or mono-, di- or tri-substituted by $C_1$–$C_4$alkyl, $C_1$–$C_4$alkoxy and/or $C_2$–$C_{20}$alkanoyl; or $C_7$–$C_9$phenylalkyl unsubstituted or mono-, di- or tri-substituted on the phenyl by $C_1$–$C_4$alkyl, $C_1$–$C_4$alkoxy and/or $C_2$–$C_{20}$alkanoyl;

Y is $C_1$–$C_{18}$alkyl, $C_5$–$C_{12}$cycloalkyl unsubstituted or mono-, di- or tri-substituted by $C_1$–$C_4$alkyl; phenyl unsubstituted or mono-, di- or tri-substituted by $C_1$–$C_4$alkyl, $C_1$–$C_4$alkoxy and/or $C_2$–$C_{20}$alkanoyl; naphthyl unsubstituted or mono-, di- or tri-substituted by $C_1$–$C_4$alkyl, $C_1$–$C_4$alkoxy and/or $C_2$–$C_{20}$alkanoyl; $C_7$–$C_9$phenylatkyl unsubstituted or mono-, di- or tri-substituted on the phenyl by $C_1$–$C_4$alkyl, $C_1$–$C_4$alkoxy and/or $C_2$–$C_{20}$alkanoyl; chlorine, bromine, a group —$(CH_2)_{2-3}$—$Si(E)_3$ or a group —$N(R)_2$ with the radicals E being independently of one another $C_1$–$C_8$alkyl or phenyl and the radicals R being independently of one another hydrogen, $C_1$–$C_4$alkyl, $C_5$–$C_{12}$cycloalkyl or phenyl unsubstituted or mono-, di- or tri-substituted by $C_1$–$C_4$alkyl, $C_1$–$C_4$alkoxy and/or $C_2$–$C_{20}$alkanoyl;

and, when m is 1 and n is zero, Y is also hydrogen;

$X_1$ and $X_2$ which are identical or different are $C_2$–$C_{12}$alkylene, $C_4$–$C_{12}$alkylene interrupted by oxygen or a group >N—R with R being as defined above; $C_2$–$C_{12}$alkenylene, $C_2$–$C_{12}$alkynylene, phenylene, biphenylene or a group of the formula (II)

wherein $R_3$ and $R_4$ which are identical or different have one of the meanings given for $R_1$ and $R_2$ and Z is oxygen, a group >N—R or a group —N(R)—N(R)—with R being as defined above; and A and B which are identical or different have one of the meanings given for $R_1$ and $R_2$ or are hydrogen, a group —$OSi(E)_3$ or a group —$Si(E)_3$ with E being as defined above; when p+q is a number from 3 to 10, A and B together also form a direct bond; and each of the radicals $R_1$, $R_2$, $X_1$, $X_2$ and Y as well as the variables m and n have the same or different definitions in the recurring structural units contained in the formula (I) and, when the compounds of the formula (I) are copolymeric, they have a random, alternate or block distribution of the individual structural units.

2. The composition according to claim 1, wherein p+q is a number from 2 to 80;

$R_1$ and $R_2$ which are identical or different are $C_1$–$C_{12}$alkyl, $C_5$–$C_7$cycloalkyl unsubstituted or mono-, di- or tri-substituted by $C_1$–$C_4$alkyl; phenyl unsubstituted or mono-, di- or tri-substituted by $C_1$–$C_4$alkyl, $C_1$–$C_4$alkoxy and/or $C_2$–$C_{20}$alkanoyl; or benzyl unsubstituted or mono-, di- or tri-substituted on the phenyl by $C_1$–$C_4$alkyl, $C_1$–$C_4$alkoxy and/or $C_2$–$C_{20}$alkanoyl;

Y is $C_1$–$C_{10}$alkyl, $C_5$–$C_7$cycloalkyl unsubstituted or mono-, di- or tri-substituted by $C_1$–$C_4$alkyl; phenyl unsubstituted or mono-, di- or tri-substituted by $C_1$–$C_4$alkyl, $C_1$–$C_4$alkoxy and/or $C_2$–$C_{20}$alkanoyl; benzyl unsubstituted or mono-, di- or tri-substituted on the phenyl by $C_1$–$C_4$alkyl, $C_1$–$C_4$alkoxy and/or $C_2$–$C_{20}$alkanoyl; chlorine, bromine, a group —$(CH_2)_{2-3}$—$Si(E)_3$ or a group —$N(R)_2$ with the radicals E being independently of one another $C_1$–$C_6$alkyl or phenyl and the radicals R being independently of one another hydrogen, $C_1$–$C_4$alkyl, $C_5$–$C_7$cycloalkyl or phenyl unsubstituted or mono-, di- or tri-substituted by $C_1$–$C_4$alkyl, $C_1$–$C_4$alkoxy and/or $C_2$–$C_{20}$alkanoyl;

and, when m is 1 and n is zero, Y is also hydrogen;

$X_1$ and $X_2$ which are identical or different are $C_2$–$C_8$alkylene, $C_4$–$C_8$alkylene interrupted by oxygen or a group >N—R with R being as defined above; $C_2$–$C_8$alkenylene, $C_2$–$C_8$alkynylene, phenylene, biphenylene or a group of the formula (II).

3. The composition according to claim 1, wherein p+q is a number from 2 to 50;

$R_1$, $R_2$ and Y which are identical or different are $C_1$–$C_{12}$alkyl, cyclohexyl unsubstituted or mono-, di- or tri-substituted by $C_1$–$C_4$alkyl; phenyl unsubstituted or mono-, di- or tri-substituted by $C_1$–$C_4$alkyl, $C_1$–$C_4$alkoxy and/or $C_2$–$C_{20}$alkanoyl; or benzyl unsubstituted or mono-, di- or tri-substituted on the phenyl by $C_1$–$C_4$alkyl, $C_1$–$C_4$alkoxy and/or $C_2$–$C_{20}$alkanoyl;

and, when m is 1 and n is zero, Y is also hydrogen;

$X_1$ and $X_2$ which are identical or different are $C_2$–$C_6$alkylene, $C_4$–$C_6$alkylene interrupted by oxygen;

$C_2$–$C_8$alkenylene, $C_2$–$C_8$alkynylene, phenylene or a group of the formula (II).

4. The composition according to claim 1, wherein $R_1$ is phenyl unsubstituted or mono-, di- or tri-substituted by $C_1$–$C_4$alkyl, $C_1$–$C_4$alkoxy and/or $C_2$–$C_{20}$alkanoyl.

5. The composition according to claim 1, wherein q is zero, p is a number from 2 to 40, m is zero and $R_1$ is phenyl unsubstituted or substituted by $C_2$–$C_{20}$alkanoyl.

6. The composition according to claim 1, wherein $X_1$ and/or $X_2$ are a group of the formula (II) and Z is oxygen.

7. The composition according to claim 1, wherein A and B are hydrogen.

8. The composition according to claim 1, wherein
q is zero and p is a number from 2 to 50;
m is zero;
$R_1$ is $C_1$–$C_{12}$alkyl, phenyl or benzyl; and
A and B which are identical or different are hydrogen or a group —Si(E)$_3$ with E being $C_1$–$C_8$alkyl.

9. The composition according to claim 1, wherein the compound of the formula (I) is

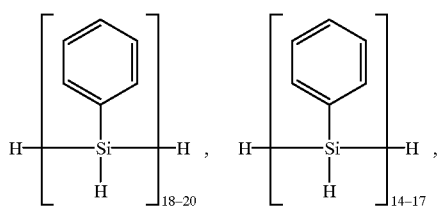

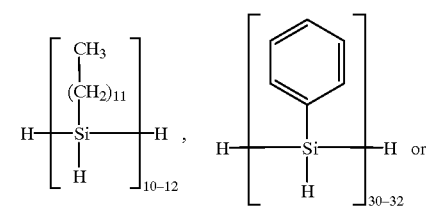

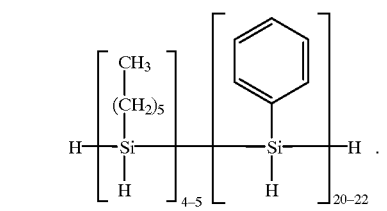

10. The composition according to claim 1, wherein the organic material is a synthetic polymer.

11. The composition according to claim 1, wherein the organic material is a polyolefin.

12. A method for stabilizing an organic material against degradation during processing, which comprises incorporating into said organic material at least one compound of the formula (I) according to claim 1.

13. A compound of the formula (Ia)

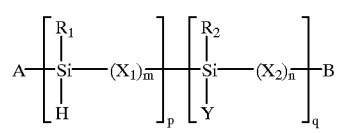

(Ia)

wherein
p+q is a number from 2 to 100 and q varies from 0 to 50% of the sum of p+q;

m and n which are identical or different are zero or 1;

$R_1$ and $R_2$ which are identical or different are $C_1$–$C_{18}$alkyl, $C_5$–$C_{12}$cycloalkyl unsubstituted or mono-, di- or tri-substituted by $C_1$–$C_4$alkyl; phenyl mono-, di- or tri-substituted by $C_1$–$C_4$alkoxy and/or $C_2$–$C_{20}$alkanoyl; naphthyl unsubstituted or mono-, di- or tri-substituted by $C_1$–$C_4$alkyl, $C_1$–$C_4$alkoxy and/or $C_2$–$C_{20}$alkanoyl; or $C_7$–$C_9$phenylalkyl mono-, di- or tri-substituted on the phenyl by $C_1$–$C_4$alkyl, $C_1$–$C_4$alkoxy and/or $C_2$–$C_{20}$alkanoyl;

Y is $C_1$–$C_{18}$alkyl, $C_5$–$C_{12}$cycloalkyl unsubstituted or mono-, di- or tri-substituted by $C_1$–$C_4$alkyl; phenyl unsubstituted or mono-, di- or tri-substituted by $C_1$–$C_4$alkyl, $C_1$–$C_4$alkoxy and/or $C_2$–$C_{20}$alkanoyl; naphthyl unsubstituted or mono-, di- or tri-substituted by $C_1$–$C_4$alkyl, $C_1$–$C_4$alkoxy and/or $C_2$–$C_{20}$alkanoyl; $C_7$–$C_9$phenylalkyl unsubstituted or mono-, di- or tri-substituted on the phenyl by $C_1$–$C_4$alkyl, $C_1$–$C_4$alkoxy and/or $C_2$–$C_{20}$alkanoyl; chlorine, bromine, a group —(CH$_2$)$_{2-3}$—Si(E)$_3$ or a group —N(R)$_2$ with the radicals E being independently of one another $C_1$–$C_8$alkyl or phenyl and the radicals R being independently of one another hydrogen, $C_1$–$C_4$alkyl, $C_5$–$C_{12}$cycloalkyl or phenyl unsubstituted or mono-, di- or tri-substituted by $C_1$–$C_4$alkyl, $C_1$–$C_4$alkoxy and/or $C_2$–$C_{20}$alkanoyl;
and, when m is 1 and n is zero, Y is also hydrogen;

$X_1$ and $X_2$ which are identical or different are $C_2$–$C_{12}$alkylene, $C_4$–$C_{12}$alkylene interrupted by oxygen or a group >N—R with R being as defined above; $C_2$–$C_{12}$alkenylene, $C_2$–$C_{12}$alkynylene, phenylene, biphenylene or a group of the formula (II)

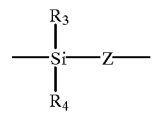

(II)

wherein
$R_3$ and $R_4$ which are identical or different have one of the meanings given for $R_1$ and $R_2$ and Z is oxygen, a group >N—R or a group —N(R)—N(R)—with R being as defined above; and
A and B which are identical or different have one of the meanings given for $R_1$ and $R_2$ or are hydrogen, a group —OSi(E)$_3$ or a group —Si(E)$_3$ with E being as defined above; when p+q is a number from 3 to 10, A and B together also form a direct bond; when $R_1$ and/or $R_2$ are $C_1$–$C_6$alkyl, at least one group of the formula (II) is present in the compounds of the formula (Ia);
each of the radicals $R_1$, $R_2$, $X_1$, $X_2$ and Y as well as the variables m and n have the same or different definitions in the recurring structural units contained in the formula (Ia) and, when the compounds of the formula (Ia) are copolymeric, they have a random, alternate or block distribution of the individual structural units.

14. The compound according to claim 13, wherein
p+q is a number from 2 to 80;
$R_1$ and $R_2$ which are identical or different are $C_{10}$–$C_{18}$alkyl, $C_5$–$C_7$cycloalkyl unsubstituted or mono-, di- or tri-substituted by $C_1$–$C_4$alkyl; phenyl mono-, di- or tri-substituted by $C_1$–$C_4$alkoxy and/or $C_2$–$C_{20}$alkanoyl; or benzyl mono-, di- or tri-substituted on the phenyl by $C_1$–$C_4$alkyl, $C_1$–$C_4$alkoxy and/or $C_2$–$C_{20}$alkanoyl;

Y is $C_1$–$C_{10}$alkyl, $C_5$–$C_7$cycloalkyl unsubstituted or mono-, di- or tri-substituted by $C_1$–$C_4$alkyl; phenyl unsubstituted or mono-, di- or tri-substituted by $C_1$–$C_4$alkyl, $C_1$–$C_4$alkoxy and/or $C_2$–$C_{20}$alkanoyl; benzyl unsubstituted or mono-, di- or tri-substituted on the phenyl by $C_1$–$C_4$alkyl, $C_1$–$C_4$alkoxy and/or $C_2$–$C_{20}$alkanoyl; chlorine, bromine, a group —$(CH_2)_{2-3}$—$Si(E)_3$ or a group —$N(R)_2$ with the radicals E being independently of one another $C_1$–$C_6$alkyl or phenyl and the radicals R being independently of one another hydrogen, $C_1$–$C_4$alkyl, $C_5$–$C_7$cycloalkyl or phenyl unsubstituted or mono-, di- or tri-substituted by $C_1$–$C_4$alkyl, $C_1$–$C_4$alkoxy and/or $C_2$–$C_{20}$alkanoyl;

and, when m is 1 and n is zero, Y is also hydrogen;

$X_1$ and $X_2$ which are identical or different are $C_2$–$C_8$alkylene, $C_4$–$C_8$alkylene interrupted by oxygen or a group >N—R with R being as defined above; $C_2$–$C_8$alkenylene, $C_2$–$C_8$alkynylene, phenylene, biphenylene or a group of the formula (II).

* * * * *